United States Patent
Nunomura et al.

(10) Patent No.: US 6,943,973 B1
(45) Date of Patent: Sep. 13, 2005

(54) MANAGEMENT METHOD FOR REPRODUCTION ERROR AND A DISK DRIVE MAKING USE OF THE MANAGEMENT METHOD

(75) Inventors: Kunihiro Nunomura, Odawara (JP); Akira Kojima, Odawara (JP); Kazunari Kose, Odawara (JP)

(73) Assignee: Hitachi Global Storage Technologies Japan, Ltd., Kanagawa-ken (JP)

( * ) Notice: Subject to any disclaimer, the term of this patent is extended or adjusted under 35 U.S.C. 154(b) by 242 days.

(21) Appl. No.: 09/714,554

(22) Filed: Nov. 17, 2000

(30) Foreign Application Priority Data

May 22, 2000 (JP) .............................. 2000-154379

(51) Int. Cl.[7] .............................................. G11B 5/02
(52) U.S. Cl. ......................................... 360/53; 360/31
(58) Field of Search ............................... 360/25, 31, 53

(56) References Cited

U.S. PATENT DOCUMENTS

| | | | |
|---|---|---|---|
| 5,287,363 A | | 2/1994 | Wolf et al. |
| 5,898,534 A | * | 4/1999 | Gray ........................ 360/77.01 |
| 6,098,077 A | * | 8/2000 | Sassa ......................... 707/202 |
| 6,122,235 A | * | 9/2000 | Arai ......................... 369/53.35 |
| 6,496,313 B1 | * | 12/2002 | Haines et al. .................. 360/53 |
| 6,523,142 B1 | * | 2/2003 | Igari et al. ..................... 714/55 |
| 6,697,958 B1 | * | 2/2004 | Yada et al. ..................... 714/6 |
| 2001/0016884 A1 | * | 8/2001 | Sato et al. ..................... 710/29 |
| 2002/0144186 A1 | * | 10/2002 | Ito .............................. 714/42 |

FOREIGN PATENT DOCUMENTS

| | | |
|---|---|---|
| EP | 836187 A1 | 6/1995 |
| EP | 880136 A2 | 5/1998 |
| EP | 018681 A2 | 8/1999 |
| EP | 001342 A2 | 11/1999 |
| JP | 7-320418 | 12/1995 |
| WO | 00/75923 A1 | 12/2000 |
| WO | 00/79533 A1 | 12/2000 |

\* cited by examiner

*Primary Examiner*—David Hudspeth
*Assistant Examiner*—Varsha A Kapadia
(74) *Attorney, Agent, or Firm*—Mattingly, Stanger, Malur & Brundidge, P.C.

(57) ABSTRACT

Heretofore, when an error occurs during data reproduction, a retry is repeated until the error is corrected, which leaves a possibility of data transfer being not completed within a specified time. Only one piece of error information on uncorrected errors is informed to a host system even if the errors have occurred in a plurality of unit data. To solve the problem, a magnetic disk drive is provided which can transfer data within a specified time because the number of retries executed when errors occur is limited to a range that data transfer can be finished within a specified time. The disk drive generates error information regarding all errors caused in reproduction and communicates error information along with reproduced data to a host system. The disk drive is capable of concurrent execution of data processing that allows of errors and data processing that does not allow of errors without demanding that the disk drive be furnished with high performance.

8 Claims, 7 Drawing Sheets

FIG.3

| Byte \ Bit | 7 | 6 | 5 | 4 | 3 | 2 | 1 | 0 | |
|---|---|---|---|---|---|---|---|---|---|
| 0 | Valid | Error Code ||||||| ~20 |
| 1 | Segment Number ||||||||  |
| 2 | File Mark | EOM | ILI | R | Sense Key |||| ~21 |
| 3 | Information Byte(MSB) ||||||||  |
| 4 | Information Byte ||||||||  |
| 5 | Information Byte ||||||||  ~22 |
| 6 | Information Byte(LSB) ||||||||  |
| 7 | Additional Sense Length ||||||||  |
| 8 to 11 | Command-Specific Information ||||||||  |
| 12 | Additional Sense Code ||||||||  |
| 13 | Additional Sense Code Qualifier ||||||||  |
| 14 | FRU Code ||||||||  |
| 15 | SKSV | |||||||  |
| 16 | Sense-Key Specific ||||||||  |
| 17 |  ||||||||  |
| 18 to 31 | Additional Sense Bytes ||||||||  |

MANAGEMENT METHOD FOR REPRODUCTION ERROR AND A DISK DRIVE MAKING USE OF THE MANAGEMENT METHOD

BACKGROUND OF THE INVENTION

The present invention relates to a magnetic disk drive and more particularly concerns a management method for managing reproduction errors when it is required that data read from the disk drive should has continuity (in other words, it is required that more than a certain amount of data should be read within a specified time).

Conventionally, the disk drive executes a data reproduction process with top priority placed on the reliability of data. For this reason, if an error is detected during reproduction of data, retry of reproduction (hereafter referred to as retry) is repeated until no errors are detected or until a specified number of retries is reached. After this, an error correction process is carried out when necessary.

An example of the mode that places top priority on the continuity of data is the read continuous mode (hereafter referred to as "RC mode") provided in the SCSI-3 (Small Computer System Interface-3) Standard of ANSI (American National Standards Institute). The RC mode is a mode in which data with a required length is transferred without performing a retry or error recovery and therefore, when an error occurs, erroneous data is transferred as it is.

As means for clarifying the content of the error, the above-mentioned SCSI-3 Standard provides the REQUEST SENSE command, by which the user can know the contents of errors and a LBA (Logical Block Address) where the error occurred.

There is technology for simultaneously outputting data and error information to a host system, one example of which is disclosed in JP-A-07-320418. According to this prior art, separate transfer lines are provided for data and error information, through which data and error information are output at the same time.

In reproduction with most preference on reliability of data, when an error is found in reproduced data, extra time is taken for retry (including rotational delay time) and error correction than when no error is found. As this excess time is consumed, an amount of data to be processed within a specified length of time cannot be processed in time, so data being deprived of its continuity.

When data is reproduced in the RC mode that gives top priority to data continuity, if reproduced data includes an error, this erroneous data is transferred without notifying the error to the host system, such as a host computer. Therefore, the host system handles wrong data as correct data.

On the other hand, when the REQUEST SENSE command is used, if data transferred by one READ command includes a number of errors, only one piece of information error (LBA) is sent to the host system but the other errors are not notified to the host system. In addition, extra time is consumed, such as time for issuing a REQUEST SENSE command, data is likely to be deprived of its continuity.

SUMMARY OF THE INVENTION

In description of embodiments of the present invention made to solve the above problems, a disk drive is disclosed, which transfers within a specified necessary time those items of reproduced data, which are to be processed in real time, such as video data and audio data, and supplies information about all errors to the host system.

The above-mentioned disk drive is provided with a function to limit the number of retries, a function to generate error information or data that indicates the presence or absence of error, and a function to transfer generated error information together with reproduced data to the host system.

The retry-number-limiting function limits the number of retries so that reproduced data can be transferred within a specified necessary time.

If data of 512 bytes is set as a piece of unit data, the error-information-generating function generates error information concerning the presence or absence of an error for each unit data in a bit map for example, when generating one or more pieces of unit data in response to one reproduction request from the host system.

The data transfer function works to transfer the generated error information together with reproduced data to the host system. More specifically, generated error information is transferred with being added at the head of or at the end of reproduced data.

BRIEF DESCRIPTION OF THE DRAWINGS

FIG. 3 is a format of extended sense data in SCSI-3 Standard;

DESCRIPTION OF THE EMBODIMENTS

Figure 1:
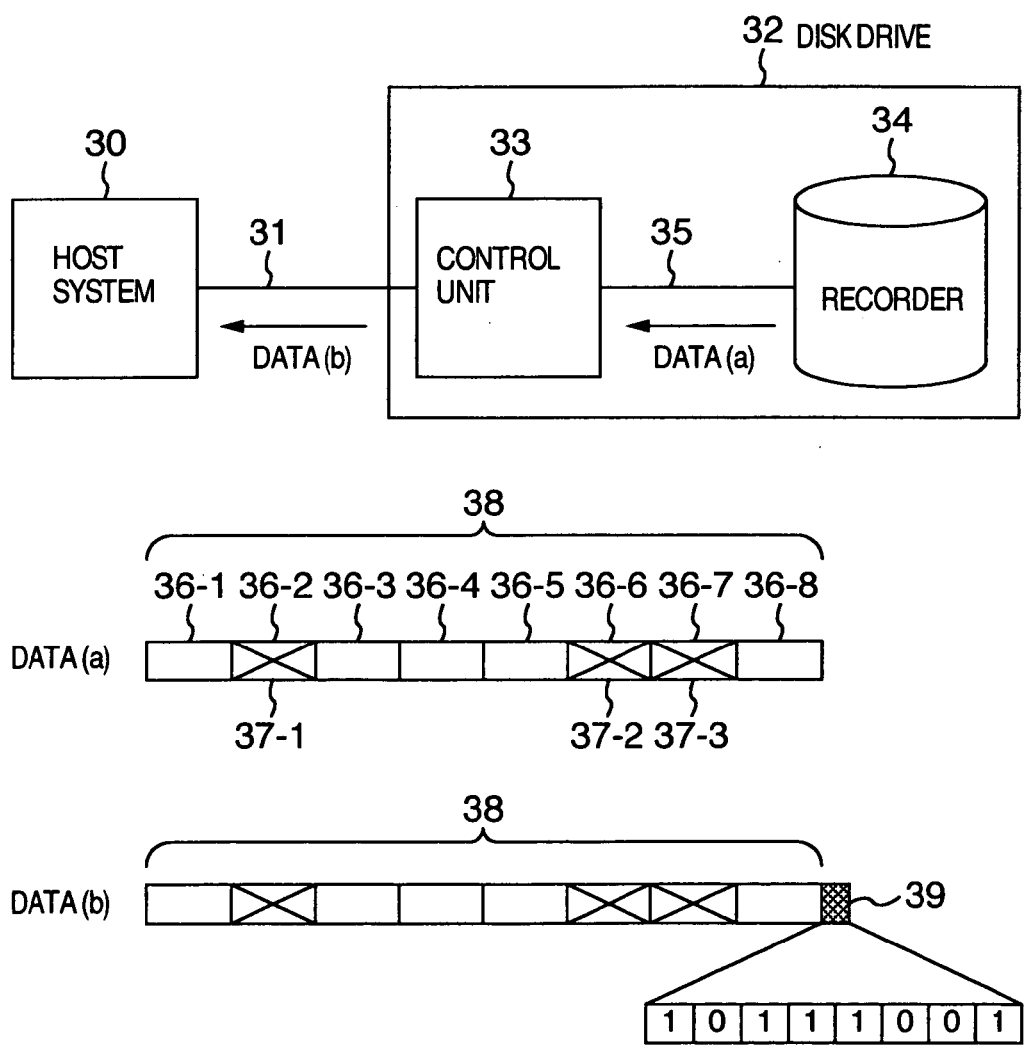
FIG. 1 is a conceptual block diagram of the disk drive according to a first embodiment of the present invention and also shows examples of data.

The present invention will be described in detail in conjunction with embodiments thereof by referring to the drawings. A first embodiment is described by referring to FIGS. 1 to 4 and 7. A magnetic disk drive is taken as an example in those embodiments, but the present invention is not limited to this type of disk drive but may be applied to optical disk drives, magneto-optical drives and other types of disk drives.

Figure 2:
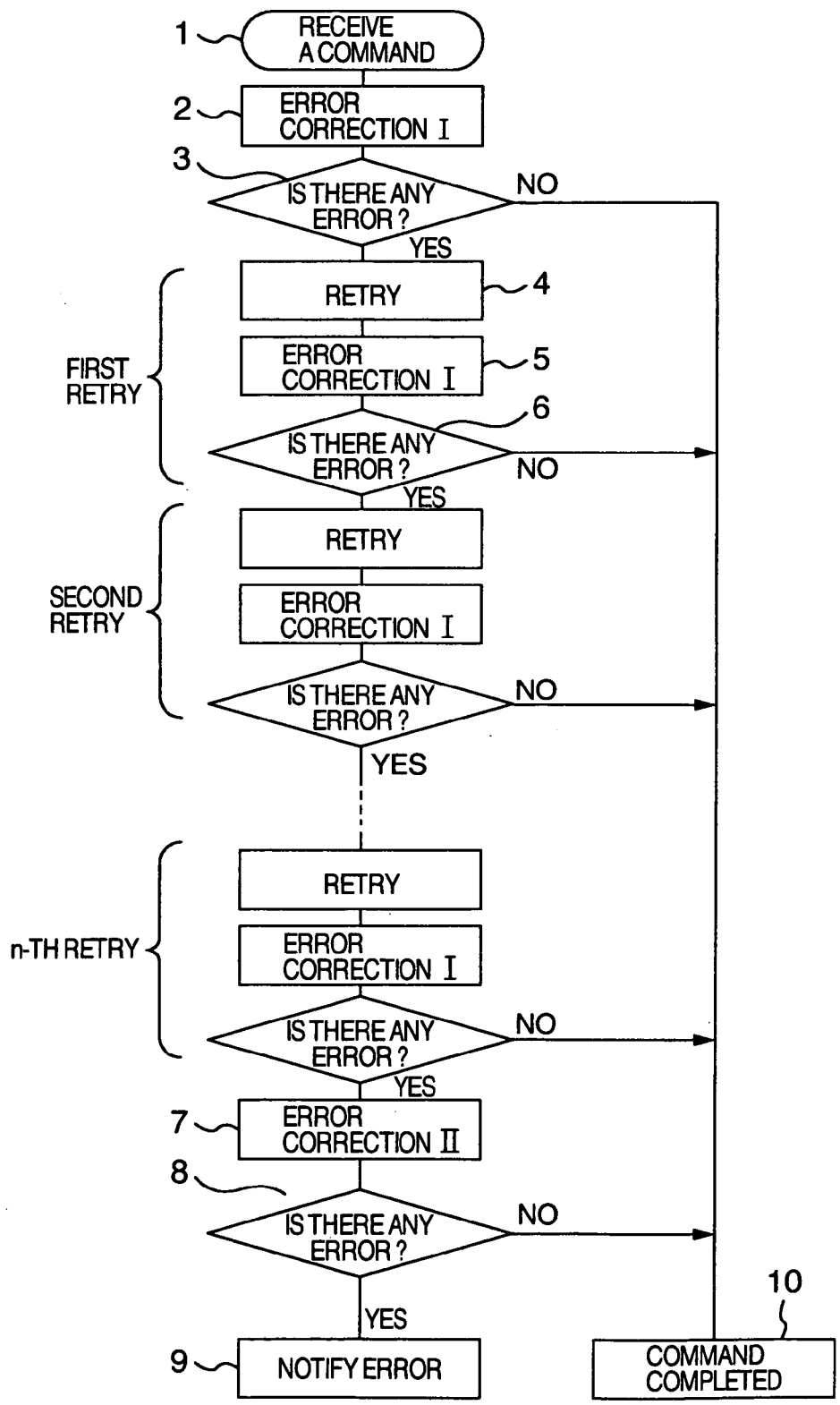
FIG. 2 is a flowchart of a routine when a reproduction error occurs in the prior art.

FIG. 2 shows in flowchart a retry action in an ordinary reproduction process. A reproduction request (e.g., a READ command in the SCSI-3 Standard) is issued from a host system (Step 1), the disk drive reads data from the disk, error checking is performed and, if there is any error, error correction I is carried out (Step 2), and errors are searched for (Step 3). The error correction I is a process that corrects errors in real time by hardware. When an error is detected in Step 3, the data is read again from the disk (Step 4) and, if there is any error, the error correction I is carried out (Step 5), and errors are searched for (Step 6). Steps 4 to 6 constitute a retry action. If any error is detected in the retry action, a further retry action is carried out. The retry action is repeated until a preset number of times is reached, and if errors have not been corrected, the process of error correction II is carried out (Step 7).

The error correction II is a software-based process that performs higher-performance error correction than the error correction I and requires more processing time. If errors have not been corrected by the error correction II (Step 8), information about errors is sent to the host system (Step 9). In a retry (Step 4), the disk drive again reads the same data stored on the disk so that it has to wait for the disk to make a minimum of one rotation. This rotation delay time for one READ command amounts to 600 ms when the disk is rotating 10,000 rpm and the preset number of retries is 100.

Data to be processed in real time, such as video data and audio data, when it is reproduced, must be transferred within a specified time; however, data transfer may be hindered by retry actions, including rotation delay time mentioned above, and error correction II. When the above-mentioned error information is sent to the host system, the host system issues a REQUEST SENSE command to check the error content.

FIG. 3 shows a format of extended sense data in SCSI-3 Standard, which shows error contents. The field at 20 indicates Error Code, the field at 21 indicates Sense Key, the field at 22 indicates the last LBA where an error occurred. The time consumed in actions attending on a REQUEST SENSE command hinders the transfer of reproduced data within a specified necessary time. Because only the last LBA where an error occurred is notified to the host system, error information for two or more errors is lacking.

FIG. 1 shows a first embodiment of the present invention. In the first embodiment, error information is sent to the host system without executing a retry action, which includes rotation delay time, and error correction II or issuing a REQUEST SENSE command. FIG. 1 shows a schematic block diagram including a host system 30 and a disk drive 32 and also shows a schematic structure of data when errors occur. For simplicity of explanation, read-out data is shown to comprise a group of unit data, including eight pieces of unit data. The host system 30 is, such as a host computer. A numeral 31 denotes a connection interface made to a standard such as SCSI connecting the host system 30 with the disk drive 32. Numeral 33 denotes a control unit for controlling the disk drive 32, 34 denotes a recorder including a disk-type recording medium, 35 denotes a connection interface connecting the control unit 33 with the recorder 34. Numeral 38 denotes data read from the recorder 34, 36-1 to 36-8 denote eight pieces of unit data, 37-1 to 37-3 denote three pieces of unit data where an error occurred and 39 denotes error information.

When data is reproduced, the host system 30 sends a READ command through the connection interface 31 to the disk drive 32 requesting it to read a plurality of unit data 36 (eight pieces in FIG. 1). The control unit 33 causes the disk drive 32 to executes a READ command and accesses the recorder 34 through the connection interface 35. Data 38 read from the recorder 34 is input to the control unit 33 through the connection interface 35.

Data (a) 38 read from the recorder 34 is pieces of unit data, which includes of eight pieces of unit data of 512 bytes, for example. If, among the pieces of unit data, some pieces (37-1 to 37-3), include an error or errors and the errors could not be corrected by error correction I carried out by the control unit 33, the control unit 33 generates error information 39 showing locations of all errors. Error information 39 is formed in a bit map in which "1" represents the absence of error and "0" represents the presence of error. Generated error information 39 is sent along with data (a) 38, which are collectively called data (b) including error information to the host system 30 through the connection interface 31.

In response to a READ command issued by the host system 30, data (b) including error information is prepared and sent to the host system. With regard to a READ command, different methods are taken as follows: 1) Agreement is made in the message phase about a data transfer method, for example, between a host system and a subordinate system as provided in SCSI-3 Standard, 2) Error information is added as data, which does not affect the data structure like a check code added to a Write/Read command in SCSI-3 Standard, or 3) Error information is handled as part of data by a Vendor Unique command in SCSI-3 Standard.

Figure 7A:
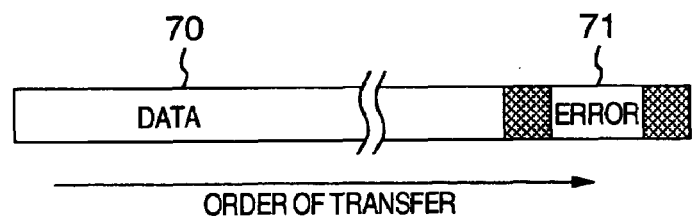
FIGS. 7A–7C show schematic structure examples of transferred data in the present invention.
Figure 7B:
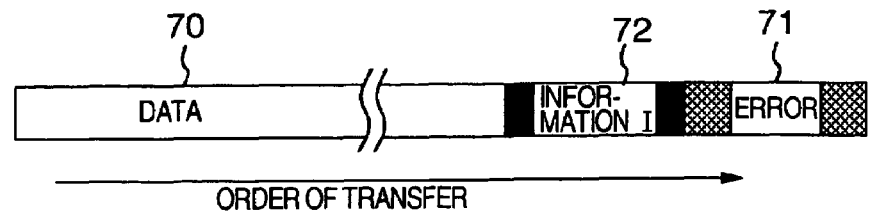
Figure 7C:
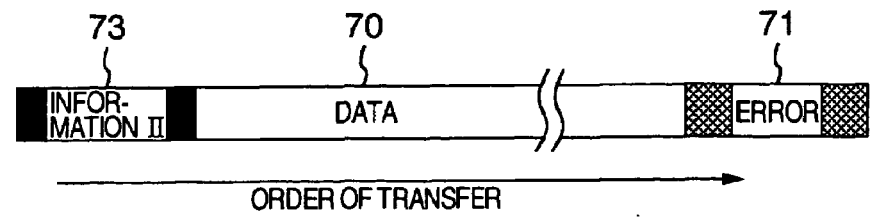

FIGS. 7A–7C are examples of structure of data (b) including error information. FIG. 7A shows that a read-out data block 70 and an error information block 71 are transferred to the host system in this order. The host system, by a command it issues, recognizes the length of each data block 70 and the length of each error information block 71 and processes data (b) including error information. FIG. 7B shows that a read-out data block 70, a data information block I 72 and an error information block 71 are transferred to the host system in this order. Information written in the data information block I 72 is information that the error information block 71 is going to start next or this information along with information about the length of the error information block 71.

FIG. 7C shows that the order in which a data information block II 73, a read-out data block 70 and an error information block 71 are transferred to the host system in this order. Information written in the data information block II 73 is information about the length of the read-out data block 70 and information about the length of the error information block 71. Also in FIG. 7C, as in FIG. 7B, at the head of the error information block 71, a data information block I 72 may be provided, in which information is written notifying that the error information block 71 is going to come next.

Figure 4:
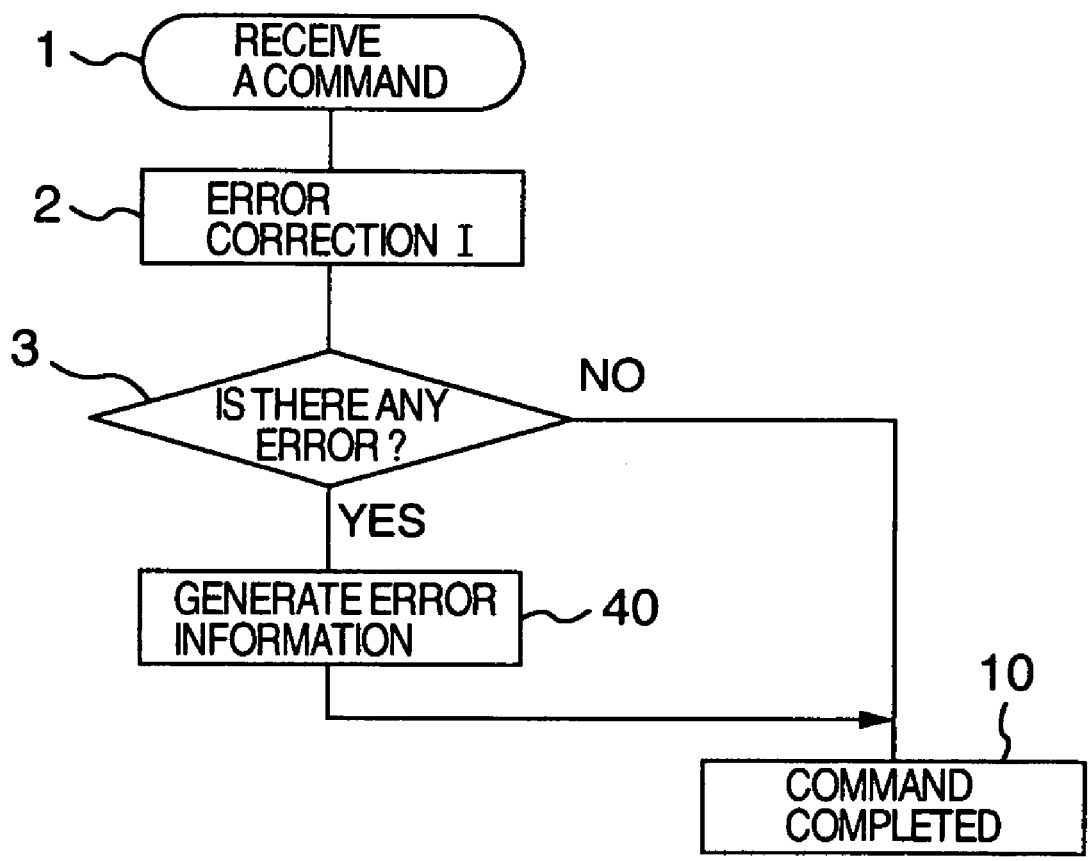
FIG. 4 is a flowchart of a routine when a reproduction error occurs in a first embodiment of the present invention.

FIG. 4 is a flowchart of the first embodiment of the present invention. FIG. 4 corresponds to the flowchart of FIG. 2 after FIG. 2 is deprived of the retry actions and added with a step of generating error information. Components like or equivalent to those described by reference to FIG. 2 are designated by like reference numerals and are not described again. A reproduction request is given by the host system (Step 1), the disk drive reads data from the disk, error checking is performed and if there is any error, error correction is carried out (Step 2), and errors are searched for (Step 3). If an error is detected in Step 3, error information or data is generated which shows the locations of all errors in the error information generating step (Step 40) and reproduced data added with error information is sent to the host system.

As has been described, according to the first embodiment, there is provided a disk drive for transferring reproduced data within a specified time to the host system together with error information showing locations of all errors.

In the foregoing description, a piece of unit data is 512 bytes long, read-out data includes eight pieces of unit data and error information is 8 bits long. However, the present invention is not limited to these values but so long as those values are within allowable ranges of the whole system, the same effects as mentioned above can be obtained. The relation between the error information length LE (in bits)

and the read-out data length LR of a number of unit data need not be LE=LR but a relation of LE≧LR has only to be satisfied. In other words, even if the error information length LE is made variable according to the read-out data length LR or even if the error information length LE is made a fixed value that surely satisfies the relation of LE≧LR, the same effects can be obtained.

A second embodiment will be described with reference to FIGS. 5 and 6. In the second embodiment, the retry action is carried out up to a preset number of times (a maximum number of retries), which is not done in the first embodiment. The user or the system designer can arbitrarily set the maximum number of retries from a required number of data, time required for a retry, the maximum speed of data transfer, etc.

Figure 5:
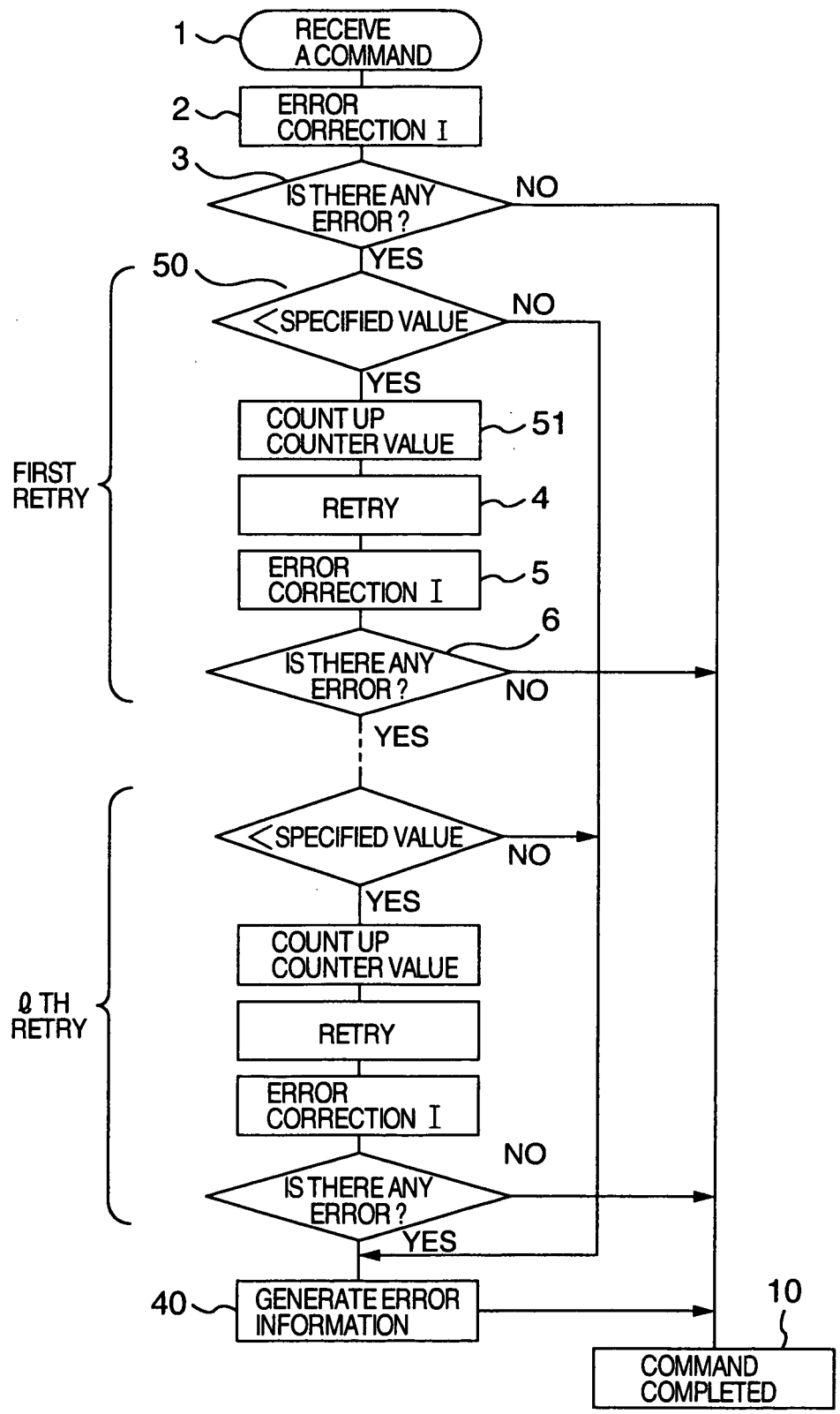
FIG. 5 is a flowchart of a routine when a reproduction error occurs in a second embodiment of the present invention.

FIG. 5 is a flowchart of the second embodiment of the present invention. FIG. 5 corresponds to the flowchart of FIG. 2 after FIG. 2 is deprived of error notification 9 and added with generation of error information 40, comparison with counter value 50, and counter value count-up 51. Components like or equivalent to those described by reference to FIG. 2 are designated by like reference numerals and are not described again.

A reproduction request is sent from the host system (Step 1), the disk drive reads data from the disk, error checking is performed and if there is any error, the error correction I is carried out (Step 2), and errors are searched for (Step 3). If an error is detected in Step 3, in the step of comparison with the counter value, the preset maximum number of retries is compared with the counter value representing the number of retries done (Step 50). When the counter value is larger than the preset maximum number of retries, error information showing the locations of all errors is generated and sent along with reproduced data to the host system in the error information generation step (Step 40).

When the counter value is smaller than the maximum number of retries, the counter value is counted up by 1 (Step 51), data is read again from the disk (Step 4), error checking is performed and if there is an error, the error correction I is carried out (Step 5), and then errors are searched for (Step 6). If Steps 50 to 51 and Steps 4 to 6 are collectively expressed as a set action of retry, when an error is detected again in another retry action, yet another retry action is performed. Thus, a retry action is repeated until a preset number 1 (1≦=n) of times is reached. If errors have not been corrected, in the subsequent error information generating step (Step 40), error information is generated which shows the locations of all errors and this error information is sent along with reproduced data to the host system. The counter should be reset on receiving each reproduction command or at fixed time intervals so as not to hinder the transfer of reproduced data within a specified time.

Figure 6:
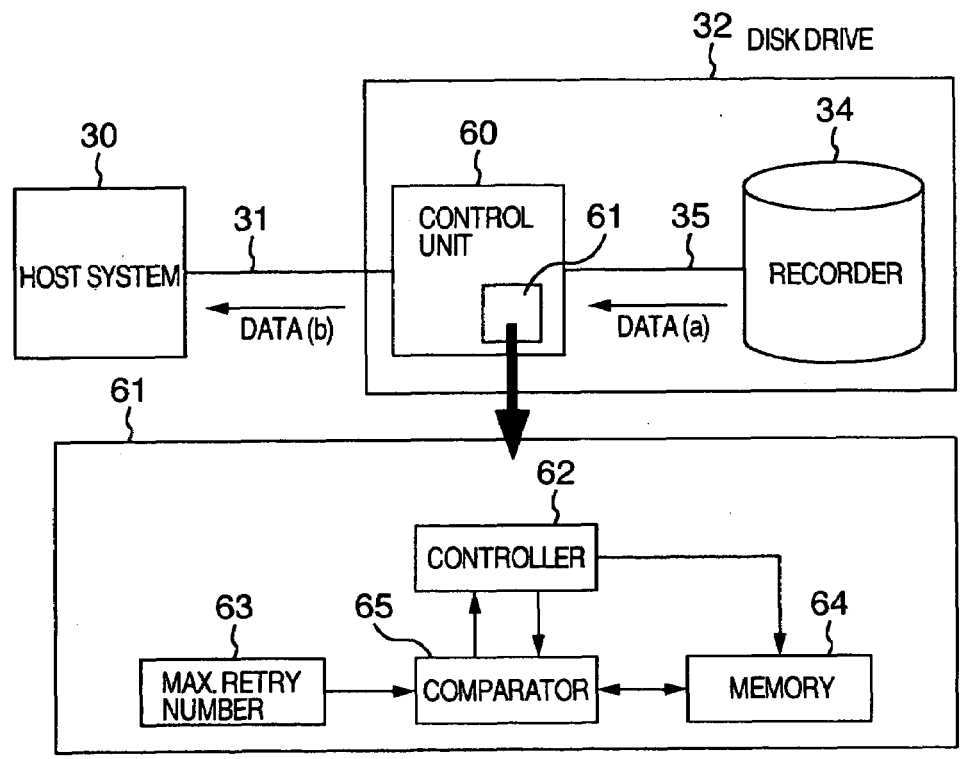
FIG. 6 is a conceptual block diagram of the disk drive according to a second embodiment of the present invention.

FIG. 6 is a schematic block diagram of the second embodiment. FIG. 6 corresponds to the block diagram of FIG. 1 after FIG. 1 has its control unit 33 replaced by a control unit 60, which includes a function block 61 for limiting the number of retries. The data format of FIG. 6 is the same as that in FIG. 1 and is not shown. Components like or equivalent to those described hereinbefore with reference to FIG. 3 are designated by like reference numerals.

When data (a) read from the recorder 34 is found to include an error and the error could not be corrected even by the error correction I by the control unit 60, a controller 62 asks a comparator 65 to compare the maximum number of retries in a table 63 (memory) with the number of retries stored in the memory 64. When the comparator 65 inputs information that the maximum number of retries is greater than the number of retries done to the controller 62, the control unit 60 causes the disk drive 32 to carry out a retry action and the controller 62 counts up by 1 the number of retries stored in the memory 64. When the comparator 65 supplies information that the maximum number of retries is equal to the number of retries done to the controller 62, the control unit 60 generates error information, and sends it together with reproduced data to the host system 30.

As has been described above, according to the second embodiment, it is possible to provide a disk drive for transferring reproduced data within a specified time with the included errors reduced to a lower proportion and communicating error information showing the locations of all errors not corrected to the host system.

In the description of the flowchart with reference to FIG. 5, though the count-up of the counter value (Step 51) is performed between comparison with the counter value (Step 50) and reading data again (Step 4), this is not intended as a limitation to the manner of embodiment, but so long as the count-up of the counter value is performed between comparison with the counter value (Step 50) and the subsequent searching for errors (Step 3), the same effects can be obtained. The basis for comparison has been stated to be the number of retries, but this is not intended as a limitation. For example, the number of retries or retry time per unit time or the number of retries or retry time per command may be used as the basis for comparison, by which the same effects can be obtained.

Figure 8:
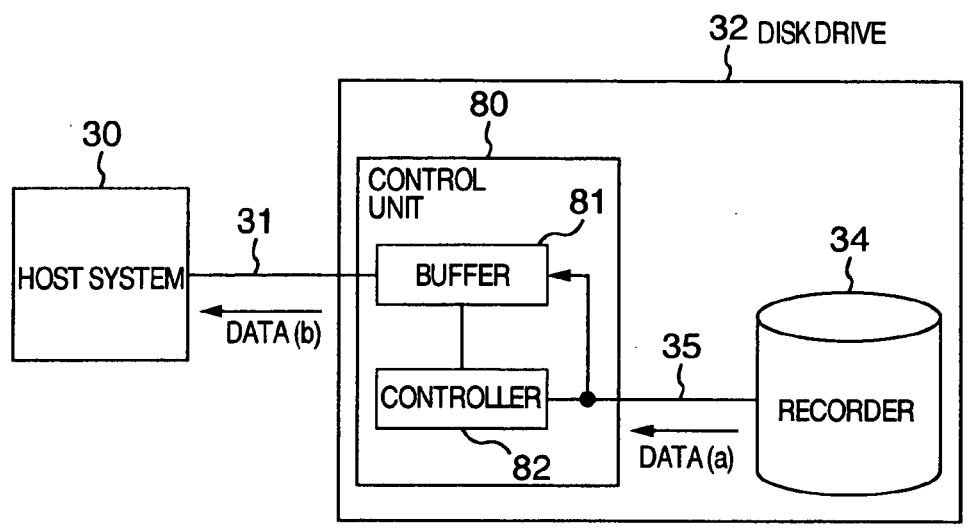
FIG. 8 is a conceptual block diagram of the disk drive according to a third embodiment of the present invention.

A third embodiment of the present invention will be described with reference to FIGS. 8 and 9. FIG. 8 is a conceptual block diagram of the host system 30 and the disk drive 32 showing the flow of read-out data according to the third embodiment. FIG. 8 corresponds to FIG. 6 after the function block 61 for description of limiting the number of retries in FIG. 6 is removed for simplicity of description and a control unit is adopted. Components like or equivalent to those described hereinbefore by reference to FIG. 1 are designated by like reference numerals and descriptions of like components are omitted.

In reproduction of data, a READ command is sent from the host system 30 to the disk drive 32 through the connection interface 31. The control unit 80 asks the disk drive 32 to execute the READ command and accesses the recorder 34 through the connection interface 35. The control unit 80 stores data (a), read from the recorder 34, in a buffer 81. When, in the reproduced data, there are some pieces of unit data having an error (or errors) and the errors have not been corrected by the error correction I by the control unit 80, the control unit generates error information showing the locations of all errors. When data (b) including error information is transferred to the host system 30, error information and read-out data (a) are transferred in this order.

Figure 9D:
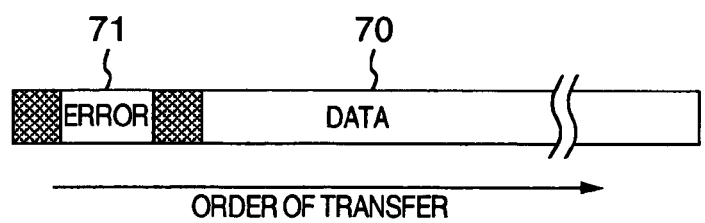
FIGS. 9D–9F show schematic structure examples of transferred data according to the third embodiment of the present invention.
Figure 9E:
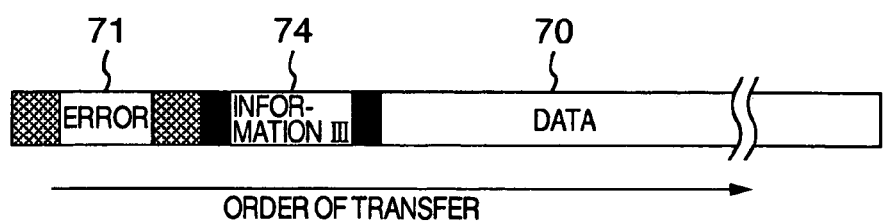
Figure 9F:
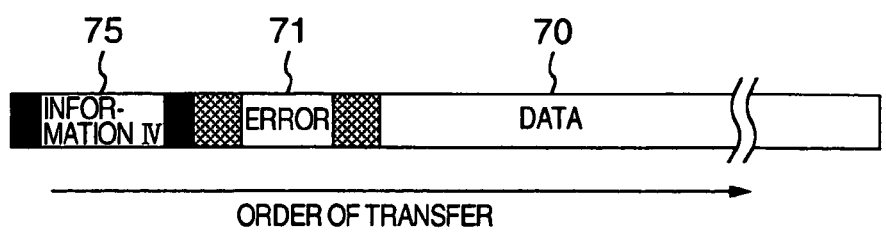

FIGS. 9D–9F are schematic structure example of data (b) including error information according to the third embodiment of the present invention. FIG. 9D shows that an error information block 71 and a read-out data block 70 are transferred to the host system in this order. The host system, by a command it issues, recognizes the length of each data block and the length of each error information block 71 and processes data (b) including error information.

FIG. 9E shows that an error information block 71, a data information block III 74 and a read-out data block 70 are transferred to the host system in this order. Information written in the data information block III 74 is information that a read-out data block 70 is going to start next or this information along with information about the length of a read-out data block 70.

FIG. 9F shows that a data information block IV 75, an error information block 71 and a read-out data block 70 are transferred to the host system in this order. Information written in the data information block IV is information about the length of an error information block 71 and information about the length of a read-out data block 70. Also in FIG. 9F, as in FIG. 9E, at the head of a read-out data block 70, a data information block III 74 may be provided, and in the latter block information is written representing that a read-out data block 70 is going to come next.

As is clear from the foregoing description, according to the third embodiment, it is possible to provide a disk drive for transferring reproduced data within a specified time, and communicating to the host system error information showing the locations of all errors, which could not be corrected, ahead of reproduced data. Consequently, it becomes possible for the host system to obtain error information before or after receiving data that contains an error (or errors). This facilitates processing, including data interpolation and so on.

By substituting a buffer part 81 for the buffer part that has been used for the error correction I, the same effects can be obtained while suppressing performance deterioration or cost increase.

From the foregoing disclosure, it will be understood that aspects of improved disk drives are provided as follows:

1) A disk drive, which records and reproduces information signals on a disk-type recording medium and which has an interface with another system for transfer of information signals, comprising;
  means for limiting the number of retries when an information signal reading error occurs;
  means for dividing an information signal transferred into unit information signals, and generating an error information signal showing the presence or the absence of an error in each of the unit information signals; and
  means for transferring generated error information together with read-out information signals through the above-mentioned transfer interface.

2) A disk drive set forth in the aspect 1), wherein the above-mentioned retry-number-limiting means includes means for counting the number of retries, means for presetting a limit number of retries and means for comparing a count value of the means for counting the number of retries with a value set by the means for presetting a limit value of retries, and wherein on and after the count value of the means for counting the number of retries reaching the value set by the means for presetting a limit value of retries, the retry-number-limiting means for functions such that a retry action does not take place.

3) A disk drive set forth in aspects 1) or 2), further comprising means for temporarily storing read-out data before it is transferred, wherein the above-mentioned generated error information signal is transferred ahead of an information signal stored in the above-mentioned temporary storage means.

Because data transfer can be finished within a specified time, the reproduction process of video data, particularly moving images, can be performed smoothly and because error information is also transferred to the host system, concurrent execution of processing moving pictures and ordinary data (information processing) can be realized, which does not demand that the magnetic disk drive be furnished with high performance.

More specifically, a disk drive can be obtained which can transfer reproduced data within a specified time and communicate error information showing the locations of all errors together with reproduced data to the host system. Further, a disk drive can be obtained which can transfer reproduced data within a specified time, with included errors decreased, and communicate error information showing the locations of errors uncorrected, together with reproduced data to the host system. Further, a disk drive can be obtained which can transfer reproduced data within a specified time and communicate error information showing the locations of errors uncorrected, ahead of reproduced data.

Having described the embodiments of the invention with reference to the accompanying drawings, it is to be understood that the invention is not limited to the embodiments and various changes and modifications could be effected therein by one skilled in the art without departing from the spirit or scope of the invention as defined in the appended claims.

What is claimed is:

1. A method for managing a reproduction error in a magnetic disk drive having a reproducing function to reproduce data in the form of a plurality of data units, and an error checking function for the reproduced data, comprising the steps of:
  receiving a request from a host system to said disk drive to reproduce data;
  reproducing a portion of said data;
  limiting a number of retries so that reproduced data can be transferred within a specified necessary time that is not less than a delay time required for at least one rotation of a magnetic disk from which the reproduced data is transferred;
  generating error information indicating the presence or absence of an error for each data unit after said step of reproducing a portion of said data; and
  outputting a portion of said reproduced data, remains of said data, and said error information.

2. A method for managing a reproduction error in a magnetic disk drive according to claim 1, wherein said error information is added at the head of or at the end of said reproduced data and forwarded to said host system by way of the same connection interface in a serial manner.

3. A method for managing a reproduction error in a magnetic disk drive according to claim 1, wherein said error information is a bit map.

4. A method for managing a reproduction error in a magnetic disk drive according to claim 2, wherein said error information is a bit map.

5. A magnetic disk drive, comprising:
  a magnetic disk recorder for holding data in a plurality of data units;
  a first connection interface connecting a host system with said disk drive;
  a control unit controlling said disk drive to execute a request from said host system;
  a second connection interface connecting said control unit with said magnetic disk recorder;
  a first function of reproducing a plurality of data units according to said request;
  a second function of limiting a number of retries so that reproduced data can be transferred within a specified necessary time that is not less than a delay time required for at least one rotation of a magnetic disk from which the reproduced data is transferred;
  a third function of generating error information resulting from said first function, which indicates the presence or absence of an error for each data unit; and
  a fourth function of outputting a portion of said reproduced data, remains of said data, and said error information in a serial manner.

6. A magnetic disk drive according to claim 5, wherein said error information is added at the head of or at the end of said reproduced data and forwarded to said host system by way of said first connection interface in a serial manner.

7. A magnetic disk drive according to claim 5, wherein said error information is a bit map.

8. A magnetic disk drive according to claim 6, wherein said error information is a bit map.

* * * * *